Sept. 20, 1927.  1,643,255
H. W. O'DOWD
THERMOSTATICALLY CONTROLLED VALVE MECHANISM
Filed Oct. 17, 1925  2 Sheets-Sheet 2
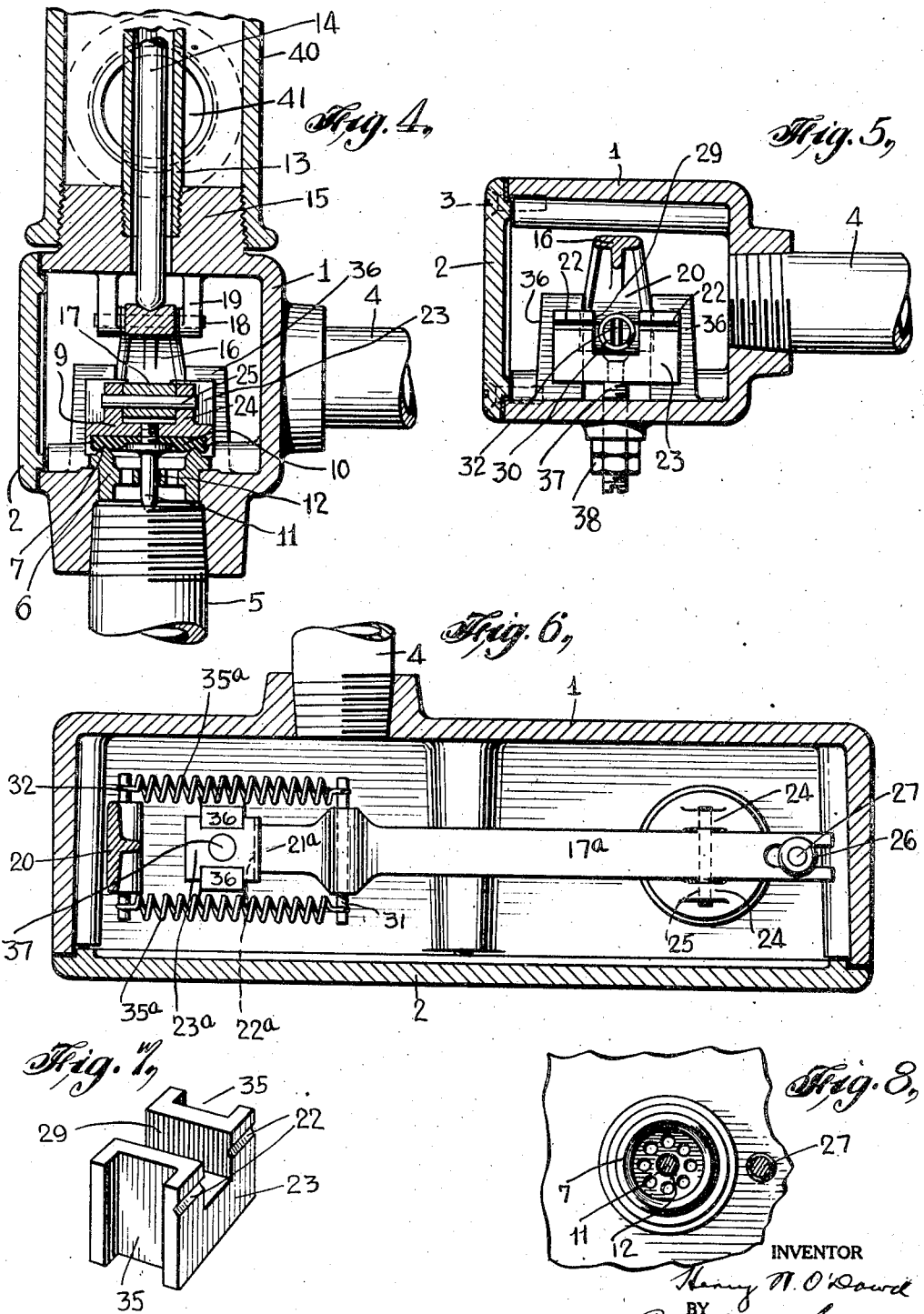
INVENTOR
Henry W. O'Dowd
BY
Roger Kennedy Campbell
ATTORNEYS Patented Sept. 20, 1927.

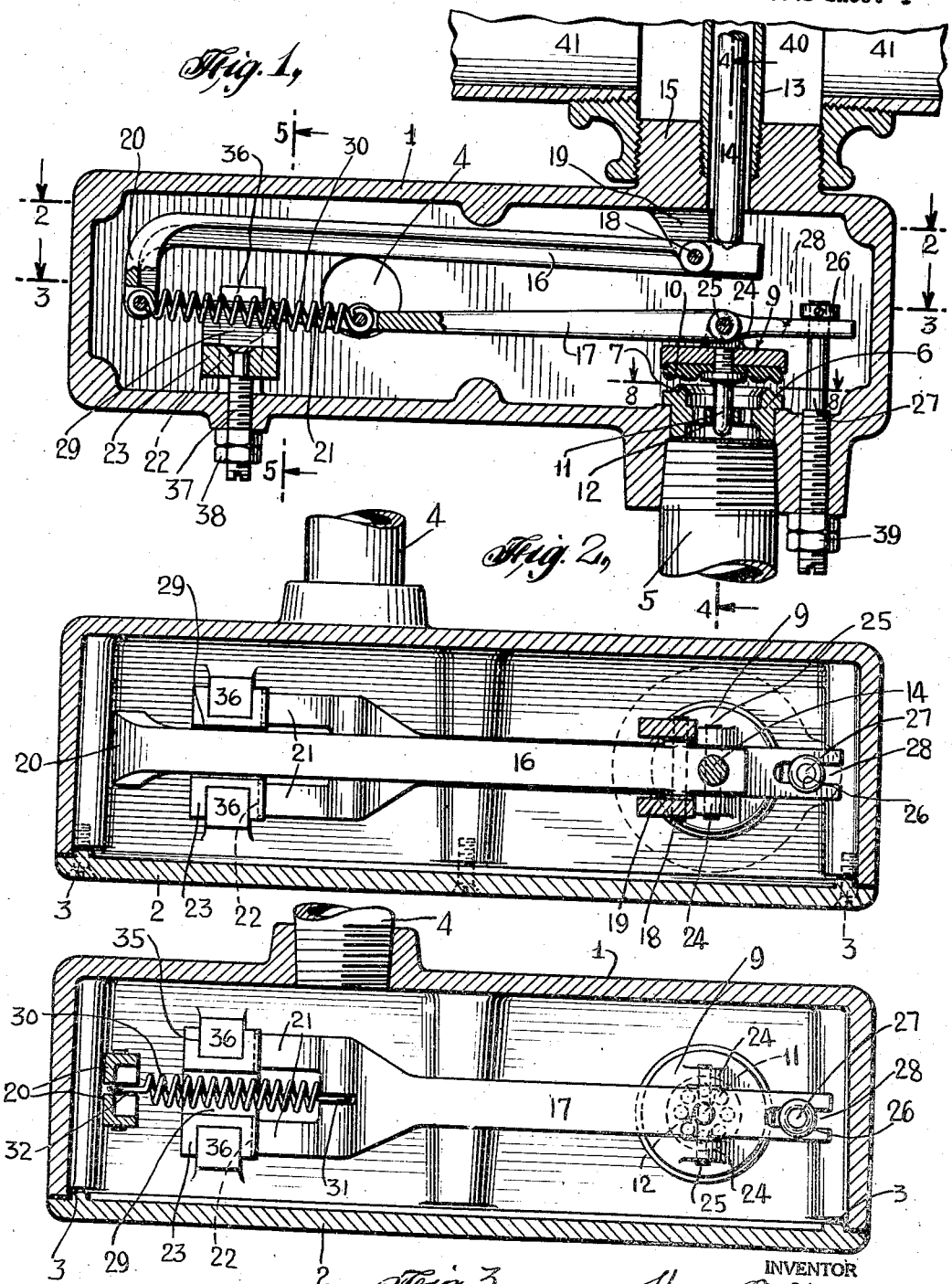

1,643,255

UNITED STATES PATENT OFFICE.

HENRY W. O'DOWD, OF JERSEY CITY, NEW JERSEY, ASSIGNOR TO STANDARD GAS EQUIPMENT CORPORATION, A CORPORATION OF MARYLAND.

THERMOSTATICALLY-CONTROLLED VALVE MECHANISM.

Application filed October 17, 1925. Serial No. 63,060.

This invention relates to thermostatically controlled valve mechanisms for gas burners or the like, and more particularly to valve mechanisms of the snap action variety, that is to say, those embodying a valve proper which is snapped under the control of the thermostat to a fully open or a fully closed position. The general object of the invention is to provide a thermostatically controlled valve mechanism of the type referred to, which is of simple, compact and rugged construction, positive and reliable in operation yet highly sensitive to temperature changes, and which comprises few parts, inexpensive to manufacture, easy to assemble or disassemble, and readily accessible for adjustment or regulation. With this general object in view, the invention consists of the novel construction, combination and arrangement of parts hereinafter described in detail and set forth in the appended claims.

These snap-action valve mechanisms, while capable of a more general application, are commonly employed in connection with water heating systems, and hence the invention is herein disclosed in an embodiment particularly adapted for such use.

Referring to the drawings:

Fig. 1 is a vertical section taken through the improved valve mechanism and showing the valve in its fully open position under one condition of adjustment;

Fig. 2 is a sectional plan view taken on the line 2—2 of Fig. 1;

Fig. 3 is a similar view taken on the line 3—3 of Fig. 1;

Fig. 4 is a vertical section taken on the line 4—4 of Fig. 1, but showing the valve in its closed position;

Fig. 5 is a similar section on the line 5—5 of Fig. 1;

Fig. 6 is a view similar to Fig. 2, illustrating a modification;

Fig. 7 is a perspective view of the fulcrum block detached; and

Fig. 8 is a sectional plan view taken on the line 8—8 of Fig. 1.

As shown in the several views, the various parts of the improved valve mechanism are enclosed within a hollow box or casing 1, provided with a removable front 2 which is held in place in a fluid-tight manner by screws or similar fastening devices 3. Fuel is admitted into the casing 1 through an inlet pipe 4 tapped into the rear wall and leading from any suitable source of supply, and fuel is discharged from the casing through an outlet pipe 5 tapped into the lower wall and leading to a suitable burner (not shown).

At the receiving end of the outlet pipe 5 there is fixed a valve ring 6 formed with a circular knife-edge valve-seat 7 and with a series of holes or openings 8 for the passage of the fuel from the casing into the pipe. Cooperating with the valve ring 6 is a valve proper 9 of the tappet type, provided on its under side with a leather washer 10 adapted to be pressed down upon the knife-edge seat 7. The valve 9 is provided with a vertical stem 11 slidable vertically in a central guiding opening 12 formed in the ring 6, the stem being preferably screwed to the valve and serving to hold the leather washer in place thereon. This specific type of valve is preferred, but any other suitable type might be employed to control the passage of the fuel from the casing to the burner.

The present invention contemplates an improved form of thermostatically controlled mechanism for throwing the valve to a fully open or a fully closed position, as the case may be. While the thermostat per se may be of any approved form or construction, it is herein shown as comprising (for the positive or expanding element) an outer copper tube 13 closed at its upper end and threaded at its lower end into a screw plug 15 on the top wall of the valve casing, and comprising (for the negative or non-expanding element) an internal nickel-steel rod 14 connected to the upper end of the copper tube and projecting downwardly through the screw plug into the casing. It hardly needs to be stated that, as the tube 13 expands and contracts, it will raise and lower the rod 14 within the casing.

Such raising and lowering movement of the thermostat rod 14 is transmitted to the valve 9 through the medium of two levers 16 and 17 of the first and third orders, respectively. The lever 16 is pivoted by a pin 18 to a pair of supporting lugs 19 depending from the top wall of the casing, having its shorter arm arranged in direct contact with the lower end of the thermostat rod 14 and its longer arm provided with a downward extension 20 terminating in a horizontal plane approximating that of the lever 17. This lever 17 is forked or bifurcated at its fulcrum end, presenting two prongs 21 sharpened to a knife edge and engaged in V-shaped cuts or notches 22 formed in a fulcrum block 23. At or near its free end, the lever 17 has pivotally suspended from it the valve 9, which latter, for the purpose, is provided with a pair of upstanding ears 24 straddling the lever and mounted to turn loosely upon a pivot pin 25 fast to the lever. The upward or valve-opening movement of the lever 17 is limited by a stop collar 26 secured to the upper end of a rod 27 rising from the lower wall of the casing and passing through an elongated slot 28 formed in the end of the lever. The two levers 16 and 17 are connected by a strong tension spring 30, one end of which is attached to the lever 17 at a point 31 located between the prongs 21 and adjacent the fulcrum point 22, and the other end of which is anchored to the lever 16 at a point 32 located at the lower extremity of the downward extension 20.

It is pointed out that the spring attaching points 31 and 32 are so located with reference to the fulcrum point 22 of the valve lever 17 that the line of pull of the spring 30 will be shifted by the thermostat lever 16 to one side or the other (above or below) the fulcrum point 22 and hence cause the spring to throw the valve 9 to its fully open or fully closed position. In other words, when the thermostat contracts, the rod 14 will be lowered within the valve casing and actuate the lever 16 so as to raise the anchorage point 32 above a horizontal line passing through the fulcrum point 22, thus causing the spring 30 to pass dead center and pull upwardly on the lever 17 to snap the valve 9 to its fully open position, as determined by the stop collar 26 (see Fig. 1).

On the other hand, when the thermostat expands, the rod 14 will be raised within the casing and allow the actuating lever to lower the anchorage point 32 below a horizontal line passing through the fulcrum point 22, thus causing the spring 30 to pass dead center in the opposite direction and pull downwardly on the lever 17 to snap the valve 9 to its fully closed position (see Fig. 4). In this connection it may be noted that the fulcrum block 23 is formed with a groove or recess 29 which, in conjunction with the space afforded between the two prongs 21, will provide ample clearance for the spring and allow it to be shifted upwardly and downwardly to opposite sides of the fulcrum point 22 in the manner above described.

As will be noted, the spring 30, due to its off-center attachment to the lever 16, tends to hold the shorter arm of said lever in constant engagement with the thermostat rod 14, which therefore exercises complete control over the actuating lever 16. It will also be noted that the spring, by pulling endwise upon the lever 17, acts to maintain its knife-edge prongs 21 in constant engagement with the V-shaped cuts or notches 22 formed in the fulcrum block 23, thus greatly simplifying the construction. It will be understood, of course, that while the movement of the thermostat rod 14 is slight in itself, the movement of the anchorage point 32 of the spring will be much greater, owing to the multiplying effect of the lever 16. In the embodiment illustrated, the ratio is about 20 to 1, although obviously it could be greater or less.

The invention also contemplates the adjustment of the valve controlling mechanism to effect the opening or closing of the valve at whatever temperatures may be desired. This is accomplished by adjusting the fulcrum block 23 and the stop collar 26 upwardly and downwardly within the casing. In the present instance, the fulcrum block 23 is formed in its opposite sides with vertical grooves or guideways 35 slidably fitted to a pair of posts 36 extended upwardly from the lower wall of the casing 1. Journalled in the under side of the block 23 is an adjusting screw 37 extended downwardly through the lower wall of the casing and threaded thereto. According to this arrangement, when the block 23 is lowered within the casing, the fulcrum point 22 of the lever 17 will be lowered to the same extent and hence require a greater movement of the anchorage point 32 of the spring 30 before the latter is shifted past dead center in effecting the closing of the valve 9. As a result, the closing of the valve will require a greater expansion on the part of the thermostat, which would be the condition required when a higher temperature of the medium to be heated (water, in the case of water heaters) is desired. For lower temperatures (or cooler water, in the case of water heaters), the reverse is true, requiring the raising of the fulcrum block 23 to reduce the extent of expansion of the thermostat. The adjustment of the stop collar 26 is provided for by extending the rod 27 downwardly through the lower wall of the casing and threading it thereto in a manner similar to the adjusting screw 37. If desired, lock bolts 38 for the screw 37, and 39 for the rod 27, may be employed to hold them in their properly adjusted position.

In the modification illustrated in Fig. 6, the valve 9 is mounted in the same way as before upon a lever 17ª having a single knife-edge prong 21ª engaged in a V-shaped cut or notch 22ª formed in the fulcrum block 23ª. This modified form of valve carrying lever 17ª is connected to the thermostatically operated lever 16 by means of two springs 35ª, instead of one as before, these springs being arranged on opposite sides of the fulcrum block 23ª and its guiding posts so as to clear these parts in being shifted to one side or the other of the fulcrum point 22ª. Except in these particulars, the parts are constructed and operated in precisely the same way as above described.

As above intimated, the improved valve mechanism, while capable of more general application, is particularly suited for use in connection with water heating systems. In my co-pending application Serial No. 58,213, it is shown as located outside the hot water storage tank so as to be readily accessible for adjustment, repair, or other purposes, the valve casing 1 being attached by means of the screw plug 15, before alluded to, to a water circulating pipe 40 connected at its upper end directly to the storage tank and at its lower end communicating with another water circulating pipe 41 leading from the lower portion of the tank to the usual heating coil. The thermostat is located in the water circulating pipe 40 and hence is subject to the changes of temperature which take place when the water is drawn into or out of the storage tank in service. If fuller information is desired, reference may be had to said co-pending application. Of course, this particular adaptation forms no part of the present invention, which contemplates the use of the improved mechanism in any suitable environment.

It will now be seen that the foregoing construction is well adapted to carry out the objects before enumerated, besides possessing other advantages unnecessary to mention. In its broader aspects the invention is not, of course, confined to the embodiment or embodiments above described, nor to any particular embodiment by which the invention may be carried into effect, as many changes and modifications will readily suggest themselves to those skilled in the art without departing from the spirit of the invention and without sacrificing its chief advantages. It should be understood, therefore, that the invention is not limited to any specific form or embodiment, except in so far as such limitations are specified in the claims.

Having thus described my invention, its construction and mode of operation, what I claim and desire to secure by Letters Patent of the United States is as follows:

1. In a thermostatically controlled valve mechanism, the combination of a thermostat, a lever actuated directly by said thermostat, a valve, a second lever carrying said valve, and a spring directly connecting the two levers and arranged so that its line of force will be shifted by the independent movement of the thermostatically actuated lever to one side or the other of the fulcrum point of the valve carrying lever in opening or closing the valve.

2. In a thermostatically controlled valve mechanism, the combination of a thermostat, a multiplying lever of the first order having its shorter arm arranged in engagement with the thermostat, a second lever of the third order fulcrumed adjacent the free end of the first-mentioned lever, a valve pivoted to the second lever near its free end, and a spring connected to the thermostatically actuated lever at its free end and to the valve carrying lever at a point near its fulcrum.

3. In a thermostatically controlled valve mechanism, the combination of a thermostatically actuated lever, a valve actuating lever, and a spring connecting said levers and arranged so that its line of force will be shifted by the thermostatically actuated lever to one side or the other of the fulcrum point of the valve actuating lever in opening or closing the valve, together with adjusting means for altering the fulcrum point of the valve actuating lever to increase or diminish the extent of movement required by the thermostatically actuated lever in shifting the spring.

4. In a thermostatically controlled valve mechanism, the combination of a thermostat, a lever actuated directly by said thermostat, a valve, a second lever carrying said valve, and a spring directly connecting the two levers and arranged so that its line of force will be shifted by the independent movement of the thermostatically actuated lever to one side or the other of the fulcrum point of the valve carrying lever in opening or closing the valve, together with adjusting means for varying the opening movement of the valve actuating lever.

5. In a thermostatically controlled valve mechanism, the combination of a thermostatically actuated lever, a valve actuating lever, and a spring connecting said levers and arranged so that its line of force will be shifted by the thermostatically actuated lever to one side or the other of the fulcrum point of the valve actuating lever in opening or closing the valve, together with adjusting means for altering the fulcrum point of the valve actuating lever to increase or diminish the extent of movement required by the thermostatically actuated lever in shifting the spring, and adjusting means for varying the opening movement of the valve actuating lever.

6. In a thermostatically controlled valve mechanism, the combination of a thermostatically actuated lever mounted to turn upon a fixed pivot, a fulcrum block, a valve actuating lever having a knife-edge engagement with said block, and a spring connecting said levers and holding the valve actuating lever to its seat in the fulcrum block, the two levers being so arranged that the movement of the thermostatically actuated lever will shift the line of pull of the spring to one side or the other of the fulcrum point of the valve actuating lever in opening or closing the valve.

7. In a thermostatically controlled valve mechanism, the combination of a thermostatically actuated lever mounted to turn upon a fixed pivot, a fulcrum block, a valve actuating lever having a knife-edge engagement with said block, and a spring connecting said levers and holding the valve actuating lever to its seat in the fulcrum block, the two levers being so arranged that the movement of the thermostatically actuated lever will shift the line of pull of the spring to one side or the other of the fulcrum point of the valve actuating lever in opening or closing the valve, together with means for adjusting the fulcrum block in opposite directions to alter the location of the fulcrum point of the valve actuating lever.

8. In a thermostatically controlled valve mechanism, the combination of a thermostat, a multiplying lever of the first order having its shorter arm arranged in engagement with the thermostat, a fulcrum block arranged adjacent the free end of said lever, a second lever of the third order having a knife-edge engagement with said fulcrum block, a valve pivoted to the second lever near its free end, and a strong tension spring connected to the thermostatically actuated lever at its free end and to the valve actuating lever at a point adjacent the fulcrum block, the said spring serving to hold the first-mentioned lever in constant engagement with the thermostat and the second lever to its seat in the fulcrum block, and the two said levers being so arranged that the movement of the thermostatically actuated lever will shift the line of pull of the spring to one side or the other of the fulcrum point of the valve actuating lever in opening or closing the valve.

9. In a thermostatically controlled valve mechanism, the combination of a valve casing having a fuel inlet and a fuel outlet, a thermostat connected to the casing and having its actuating element projecting thereinto, a multiplying lever mounted within the casing and arranged in engagement with the thermostat actuating element, a valve-seat located within the casing at the fuel outlet, a valve proper arranged to cooperate with said seat a second lever also mounted within the casing and carrying the valve, and a spring directly connecting the two levers and arranged so that its line of force will be shifted by the independent movement of the thermostatically actuated lever to one side or the other of the fulcrum point of the valve carrying lever in opening or closing the valve.

10. In a thermostatically controlled valve mechanism, the combination of a valve casing having a fuel inlet and a fuel outlet, a thermostat connected to the casing and having its actuating element projecting thereinto, a multiplying lever of the first order mounted within the casing and having its shorter arm arranged in engagement with the thermostat actuating element, a fulcrum block within the casing, a second lever of the third order having a knife-edge engagement with said block, a valve pivoted to the second lever near its free end, a valve seat formed within the casing at the fuel outlet, and a strong tension spring connected to the thermostat lever at its free end and to the valve lever at a point near the fulcrum block, said spring serving to hold the thermostat lever in constant engagement with the thermostat actuating element and the valve lever to its seat in the fulcrum block, and the two said levers being so arranged that the movement of the thermostat lever will shift the line of pull of the spring to one side or the other of the fulcrum point of the valve lever in opening or closing the valve.

11. In a thermostatically controlled valve mechanism, the combination of a valve casing having a fuel inlet and a fuel outlet, a thermostat connected to the casing and having its actuating element projecting thereinto, a multiplying lever of the first order mounted within the casing and having its shorter arm arranged in engagement with the thermostat actuating element, a fulcrum block within the casing, a second lever of the third order having a knife-edge engagement with said block, a valve pivoted to the second lever near its free end, a valve-seat formed within the casing at the fuel outlet, and a strong tension spring connected to the thermostat lever at its free end and to the valve lever at a point near the fulcrum block, said spring serving to hold the thermostat lever in constant engagement with the thermostat actuating element and the valve lever to its seat in the fulcrum block, and the two said levers being so arranged that the movement of the thermostat lever will shift the line of pull of the spring to one side or the other of the fulcrum point of the valve lever in opening or closing the valve, together with means operable from outside the casing for adjusting the fulcrum block in opposite directions to alter the location of the fulcrum point of the valve lever.

12. In a thermostatically controlled valve mechanism, the combination of a valve casing having a fuel inlet and a fuel outlet, a thermostat connected to the casing and having its actuating element projecting thereinto, a multiplying lever of the first order mounted within the casing and having its shorter arm arranged in engagement with the thermostat actuating element, a fulcrum block within the casing, a second lever of the third order having a knife-edge engagement with said block, a valve pivoted to the second lever near its free end, a valve-seat formed within the casing at the fuel outlet, and a strong tension spring connected to the thermostat lever at its free end and to the valve lever at a point near the fulcrum block, said spring serving to hold the thermostat lever in constant engagement with the thermostat actuating element and the valve lever to its seat in the fulcrum block, and the two said levers being so arranged that the movement of the thermostat lever will shift the line of pull of the spring to one side or the other of the fulcrum point of the valve lever in opening or closing the valve, together with a stop adjustable from outside the casing for limiting the opening movement of the valve lever.

13. In a thermostatically controlled valve mechanism, the combination of a valve casing having a fuel inlet and a fuel outlet, a thermostat connected to the casing and having its actuating element projecting thereinto, a multiplying lever of the first order mounted within the casing and having its shorter arm arranged in engagement with the thermostat actuating element, a fulcrum block within the casing, a second lever of the third order having a knife-edge engagement with said block, a valve pivoted to the second lever near its free end, a valve-seat formed within the casing at the fuel outlet, and a strong tension spring connected to the thermostat lever at its free end and to the valve lever at a point near the fulcrum block, said spring serving to hold the thermostat lever in constant engagement with the thermostat actuating element and the valve lever to its seat in the fulcrum block, and the two said levers being so arranged that the movement of the thermostat lever will shift the line of pull of the spring to one side or the other of the fulcrum point of the valve lever in opening or closing the valve, together with means operable from outside the casing for adjusting the fulcrum block in opposite directions to alter the location of the fulcrum point of the valve lever, and a stop adjustable from outside the casing for limiting the opening movement of the valve lever.

In testimony whereof, I have affixed my signature hereto.

HENRY W. O'DOWD.